(12) United States Patent
Ogle

(10) Patent No.: US 6,225,415 B1
(45) Date of Patent: May 1, 2001

(54) PROCESS TO SELECTIVELY PLACE FUNCTIONAL GROUPS WITHIN POLYMER CHAIN

(75) Inventor: Craig A. Ogle, Charlotte, NC (US)

(73) Assignee: University of North Carolina at Charlotte, Charlotte, NC (US)

( * ) Notice: Subject to any disclaimer, the term of this patent is extended or adjusted under 35 U.S.C. 154(b) by 0 days.

(21) Appl. No.: 09/399,569

(22) Filed: Sep. 20, 1999

(51) Int. Cl.[7] .............. C08F 297/02; C08F 297/04; C08F 4/48; B01J 31/00
(52) U.S. Cl. .............. 525/299; 525/316; 525/271; 526/173; 526/183; 526/340; 502/152; 502/157
(58) Field of Search .................. 525/299, 316, 525/271; 526/173, 183, 340; 502/152, 157

(56) References Cited

U.S. PATENT DOCUMENTS

| | | | |
|---|---|---|---|
| Re. 27,145 | 6/1971 | Jones | 260/880 |
| 3,244,664 | 4/1966 | Zelinski et al. | 260/41.5 |
| 3,281,383 | 10/1966 | Zelinski et al. | 260/23.7 |
| 4,039,593 | 8/1977 | Kamienski et al. | 260/635 |
| 4,185,042 | 1/1980 | Verkouw | 525/332 |
| 4,311,818 * | 1/1982 | Sigwalt et al. | 526/180 |
| 4,584,346 * | 4/1986 | Kitchen | 525/250 |
| 5,306,314 | 4/1994 | Cherpeck | 44/387 |
| 5,306,315 | 4/1994 | Cherpeck | 44/424 |
| 5,306,316 | 4/1994 | Cherpeck | 44/424 |
| 5,331,058 | 7/1994 | Shepherd et al. | 525/332.3 |
| 5,346,956 | 9/1994 | Gnanou | 525/24 |
| 5,486,568 | 1/1996 | Bening et al. | 525/102 |
| 5,545,691 | 8/1996 | Bening et al. | 525/102 |
| 5,677,387 | 10/1997 | Bayard et al. | 525/299 |
| 5,681,895 | 10/1997 | Bening et al. | 525/105 |
| 5,686,534 | 11/1997 | Bayard et al. | 525/271 |

OTHER PUBLICATIONS

Xudong Wei and Richard J. K. Taylor, "Organolithium additions to styrene derivatives—III. Enantioselective routes to 2-arylalkanoic acids", 1997, pp. 665–668.

* cited by examiner

Primary Examiner—James J. Seidleck
Assistant Examiner—Olga Asinovsky
(74) Attorney, Agent, or Firm—Hayes, Soloway, Hennessey, Grossman & Hage, P.C.

(57) ABSTRACT

Polymers are produced by alternate anionic polymerization of conjugated dienes and/or monomalkenyl arenes to form a living polymer chain, followed by precise incorporation of protected functional groups into that living polymer chain.

32 Claims, No Drawings

PROCESS TO SELECTIVELY PLACE FUNCTIONAL GROUPS WITHIN POLYMER CHAIN

FIELD OF THE INVENTION

The present invention relates to an improved to form polymers containing functional groups selectively dispersed through out the molecular structure, and the polymers produced by that process.

BACKGROUND OF THE INVENTION

Prior art anionic polymerization processes of conjugated dienes and monoalkenyl arenes are described in U.S. Pat. Nos. 4,039,593 and Re. 27,145, which are hereby incorporated herein by reference. Typical living anionic polymer structures formed using such prior processes include:

R—A—Li
R—A/B—Li
R—A—B—Li
R—A/B—B—Li
R—A—A/B—Li
R—A—B—A—Li wherein A and B each represent polymerized units of a single anionically-polymerizable monomer, A/B represents random polymerized units of two different anionically-polymerizable monomers, and R is the residue of the lithium initiator.

Use of initiators which include a protected functional group is also known in the art. After polymerization, the protective group can be removed to yield a polymer having a desired terminal functional group. For example, U.S. Pat. No. 5,331,058, incorporated herein by reference, teaches use of an alkyl lithium initiator having a terminal trimethylsilyl group. After the anionic polymerization is complete, the trimethylsilyl group can later be removed leaving a hydroxy-terminated hydrocarbon polymer.

This prior art technology, however, only allows incorporating functionally at the terminus of the polymer chain. Copolymerization of monomers having protected functional groups leads to a random distribution of such functionality throughout the polymers formed.

Applicant's novel process, however, allows more precise placement of protected functionality along the molecules structure of a hydrocarbon polymer. Therefore, the molecular weight between such functional groups can be better controlled to form more useful polymeric materials.

SUMMARY OF THE INVENTION

Applicant's novel process involves sequentially polymerizing conjugated dienes and/or monoalkenyl arenes to form a first anionically terminated living polymeric segment. This first living polymeric segment can comprise a homopolymer, a random copolymer, or a block copolymer. A single unit of structure I or II is then added to form a second living polymer.

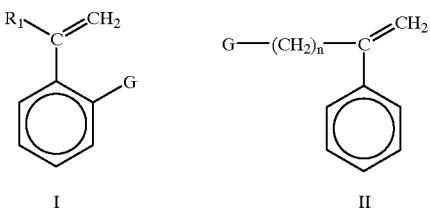

I          II wherein $R_1$ is H or alkyl, n is 1 to 5, and G is an electron donating chemical moiety, such as those moieties which include hetero atoms containing one or more pairs of unshared electrons. For example, G can be selected from the group consisting of —O—$CH_3$, —O—$CH_2$—O—$CH_3$, —O—$CH_2$—Phenyl, —S—$CH_3$, —$CH_2$—O—$CH_3$, —$CH_2$—N($CH_3$)$_2$, and —O—$CH_2$—CH=$CH_2$. As those skilled in the art will appreciate, G comprises a protected functional group.

A second monomer is then added to the second living polymer to form a third living polymer. The second polymer segment formed can comprise a homopolymer, a random copolymer, or a block co-polymer. This second polymeric segment may be identical to the first polymeric segment, or it may differ in composition and/or molecular weight.

In a first embodiment, the third living polymer may be quenched with a proton donor. In another embodiment, this third living polymer can be reacted with one of various coupling agents to form a linear polymer, a three arm radial polymer, or a four arm radial polymer.

In yet another embodiment, another single unit of compound I or compound II can be added to the third living polymer to form a fourth living polymer. The second incorporated protected functional group may be the same as the first such incorporated functional group, or it may comprise a different protected functional group. In another embodiment, the fourth living polymer can be quenched with a proton donor.

In an alternative embodiment, a third monomer can be added to the fourth living polymer to form a fifth living polymer which includes a third polymeric segment. This third polymeric segment can be identical to the first polymeric segment and/or the second polymeric segment, or it may differ from both the first and second segments in composition and/or molecular weight.

The fifth living polymer can be quenched or reacted with various coupling agents to form various linear polymers, a three arm radial polymer, or a four arm radial polymer.

DETAILED DESCRIPTION OF THE PREFERRED EMBODIMENTS

The preferred group of anionically polymerizable monomers used in the instant invention include 1,3-butadiene, 2,3-dimethyl-1,3-butadiene, piperylene, 3-butyl-1,3-octadiene, isoprene, and 2-phenyl-1,3-butadiene. The preferred group of monoalkenyl arenes include styrene, the methylstyrenes, the propylstyrenes, vinylnaphthalene, cyclohexylstyrenes, p-tolystyrene, and 1-vinyl-5-hexylnaphthalene.

The initiation system for the present invention may be any known mono- or difunctional initiators. In the context of the present invention those skilled in the art will appreciate that the initiators used broadly include organometallic compounds of the formula $R^-M^+$, wherein $R^-$ is an anionic alkyl or arenyl moiety, and $M^+$ is metal cation such as $Li^+$, $Na^+$, or $K^+$.

Preferred monofunctional initiators include, methyllithium, isopropyllithium, n-hexyllithium, m-octyllithium, naphthyllithium, t-octylilithium, n-dodecyllithium, n-eicosyllithium, phenyllithium, p-tolyllithium, 4-phenylbutyllithium, cyclohexyllithium, sec-butyllithium, n-butyllithium, alpha-methylstyryllithium, 1,1-diphenylhexyllithium, diphenylmethyllithium or -sodium or -potassium and 1,1-diphenyl-3-methylphenyllithium, dimethyllithium amide, diethyl lithium amide, and the like.

The preferred difunctional initiator is 1,1,4,4-tetraphenyl-1,4-dilithiobutane. A most preferred initiator comprises the addition product of any one of the alkyllithium compounds recited above with either compound I or compound II. This most preferred initiator can be formed by adding compound I, or compound II, or mixtures of compound I and compound II to any of the aforementioned alkyllithium compounds.

The amount of initiator used depends upon the desired molecular weight of the polymer to be formed. Normally the initiator is used in the range of about 0.1 to about 100 millimoles per 100 grams of total monomers.

The polymerization reaction is carried out in the presence of an aprotic solvent. Preferably the solvent is a paraffinic, cycloparaffinic or aromatic hydrocarbon having 4 to 10 carbon atoms or a mixture of such solvents. Examples of such solvents are n-hexane, n-heptane, 2,2,4-trimethylpentane, cyclohexane, benzene and toluene. Tetrahydrofuran may also be preferably used as the polymerization solvent.

The first step of the polymerization process forms a living anionic polymer. This first step is carried out by reacting the metal initiator system described above, i.e. R—Li, in the solvent system described above, with the first respective monomer or monomers to form the first living polymer chain.

This first polymerization can be carried out in a single step or in a sequence of steps. In the case where the first living polymer chain is a homopolymer or a random or tapered copolymer of two or more monomers, the monomers are simultaneously polymerized with the metal initiator. In the case where the first living polymer chain is a block copolymer comprising two or more homo- or copolymer blocks, these individual blocks can be generated by incremental or sequential monomer addition.

The polymerization can be carried out over a range of solids levels, preferably from about 5 weight percent to about 80 weight percent polymer, most preferable from about 10 weight percent to about 40 weight percent. For high solids polymerization, it is preferable to add the monomer in increments to avoid exceeding the desired reaction temperature.

The polymerization reaction usually occurs within a period of time ranging from about a few minutes up to about 6 hours. Preferably, the reaction is carried out within a time period of about 10 minutes to about 2 hours. The polymerization temperature is not critical and will generally be in a range of about 40° C. to about 150° C., preferably in a range of about 40° C. to about 90° C.

At the conclusion of the first polymerization reaction, a living polymer having structure III is formed:

R=FIRST POLYMER CHAIN—Li   III

The molecular weight of living polymer III can vary widely between about 500 to about 200,000, most preferably between about 1000 and about 100,000.

Living polymer III is then reacted with an approximately equimolar, or stoichiometric amount, of compound I or compound II to form living polymer IV:

R=FIRST POLYMER—FM—Li   IV wherein FM represents the added single functional monomer unit corresponding to either compound I or compound II, and R is described above.

The reaction of ortho-substituted styrene compounds, wherein the ortho substituents include hetero atoms including oxygen, nitrogen, and sulfur, with organolithium compounds followed by electrophilic trapping is reported by Xudong Wei and Richard Taylor in Tetrahedron: Asymmetry 8(5), 665–668 (1997), incorporated herein by reference. Wei and Taylor report the addition product of butyllithium to such ortho-substituted styrenes, after carboxylation, gives a range of 2-phenylheptanoic acids with enantiomeric excesses up to 72%.

It has been found that only a single molecule of compound I or compound II will add to an anionically terminated alkyl moiety having a lithium counterion. For example, compound A, corresponding to compound I with $R_1=CH_3$ and $G=O—CH_3$, was prepared from methoxybenzene as shown below:

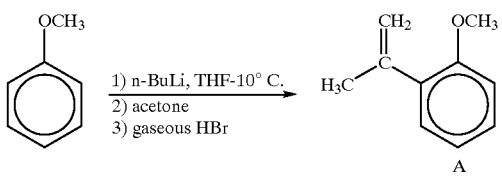

Two equivalents of compound A were reacted with a 1 equivalent of 1.6 M sec-butyllithium using both hexane and tetrahydrofuran as solvents. The reaction in hexane was carried out at room temperature, while the reaction in THF was run at −78° C. In both reactions, 0.50 millimoles of 1.6 M sec-butyllithium was added to each solvent followed by 1.0 millimoles of compound A. The mixtures were allowed to react overnight. An aliquot of each reaction was quenched with water and then analyzed by a gas chromatograph/mass spectrometer ("GC/MS"). In each case, the GC/MS indicated only one product having a molecular weight of 206 which corresponds to the mono-adduct of compound A and the alkyl anion even though an excess of compound A was available.

Those skilled in the art will appreciate that the other embodiments of compound I can be similarly prepared from the corresponding substituted benzenes by reaction with n-butyllithium and acetone in accord with the preparation of compound A shown above. Those skilled in the art will further appreciate that compound II can be prepared from benzene and the appropriately substituted acetone compounds using the reaction scheme shown above.

It is believed that the presence of the heteroatom(s) in pendent group G coordinates with the lithium ion thereby stabilizing the addition product of compound I or compound II and the living anionic polymer chain. Therefore, only an equimolar, or stoichiometric, amount of compound I or compound II will be consumed in the reaction between living polymer III and compound I or compound II.

As those skilled in the art will appreciate, the addition of a stoichiometric amount of a functional monomer to a living polymer chain does not generally result in the addition of a single unit of that monomer to each polymer chain. Quite to the contrary, some chains will add a single unit while others will add multiple units and still other living polymer chains will remain unchanged. Such a distribution of reaction products results in a wide variation of average molecular weight between functional groups in the final polymer. In sharp contrast, however, because only a single unit of compound I or compound II adds to living polymer chain III, compounds I and II afford remarkable specificity in engineering polymers having a uniform molecular weight between pendent functional groups.

Incorporation of compound I or compound II into living polymer III introduces a protected functional group into that growing chain. As those skilled in the art will appreciate, pendent methoxystyryl moieties (G=—O—CH$_3$) can later be cleaved to give pendent phenol groups. Pendent methyl styryl thioether groups (G=—S—Me) can be cleaved to pendent thiophenol groups. Benzyl methyl ether groups (G=—CH$_2$—O—Me) can be cleaved to give pendent benzyl alcohol groups. A variety of processes for removal of such protecting groups are known; for a review, see T. W. Greene, "Protective Groups in Organic Synthesis", J. Wiley and Sons, New York, 1981, incorporated herein by reference.

Such polymeric phenols, thiophenols, and alcohols are useful as chain extenders and/or polyols in reactions with polyisocyanates to form plastic and foam articles. In addition, such polymeric compounds can be used to cure a wide variety of epoxy resins.

To add compound I or compound II to living polymer III, a stoichiometric amount of compound I or compound II is added to living polymer III. The reaction usually occurs within a period of time ranging from about a few minutes up to about 24 hours. Preferably, the reaction is carried out within a time period of about 10 minutes to about 2 hours. The reaction temperature is not critical and will generally be in a range of about −78° C. to about 100° C., preferably in a range of about 40° C. to about 90° C.

After formation of living polymer IV is complete, a second polymerization reaction using the same or difference monomers in run to form living polymer V:

R—FIRST POLYMER—FM—SECOND POLYMER—Li    V wherein FM and R are as described above. The procedure for conducting this second polymerization is identical to the procedure set forth above for preparing living polymer III. The molecular weight of the second polymeric segment formed can vary widely between about 500 to about 200,000, most preferably between about 1000 and about 100,000. Moreover, the molecular weight of the second polymeric segment may be roughly the same as the molecular weight of the first polymer segment, or it may be different.

Reaction of a living anionic polymer with a proton donor is sometimes called a quenching reaction because a non-living polymer results. For example, reaction of living polymer X—A—Li with water yields a polymer of structure X—A—H.

A living polymer can also be reacted with a coupling agent. A wide variety of such coupling agents is known. For example, U.S. Pat. No. 5,681,895, incorporated herein by reference, teaches coupling of metal terminated anionic polymers with a trialkoxysilane to form a three armed radial polymer. U.S. Pat. No. 3,244,664, incorporated herein by reference, teaches the use of certain silicic compounds including silicon tetrachloride to form a four armed radial polymer. U.S. Pat. No. 3,281,383, incorporated herein by reference, teaches the use of multifunctional coupling agents having three or more reactive sites, including polyepoxides, polyisocyanates, polyimines, polyaldehydes, polyketones, polyanhydrides, polyesters, polyhalides and mixtures thereof.

Living polymer V can be quenched with a proton donor to form polymer VI:

R—FIRST POLYMER—FM—SECOND POLYMER—H    VI wherein FM and R are as described above. In a separate embodiment, living polymer V can be coupled using a difunctional coupling agent to form a linear polymer. It is preferable to perform the coupling reaction at a temperature of about 30° C. to about 80° C. It is also preferable to add the coupling agent as soon as polymerization is complete. If the polymeric lithium ion is held at this temperature for long periods of time, termination reactions that limit the coupling can occur. For example, living polymer V can be coupled with dimethoxydimethyl silane to give polymer VII:

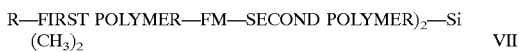
R—FIRST POLYMER—FM—SECOND POLYMER)$_2$—Si (CH$_3$)$_2$    VII wherein FM and R are as described above.

In a separate embodiment, living polymer V can be coupled with a trifunctional coupling agent in the manner described above to form a three arm radial polymer. For example, living polymer V can be coupled with trimethoxysilane to form three arm radial polymer VIII:

(R—FIRST POLYMER—FM—SECOND POLYMER)$_3$—SiH  VIII wherein FM and R are as described above.

In a separate embodiment, living polymer V can be coupled with a tetrafunctional coupling agent in the manner described above to form a four arm radial polymer. For example, living polymer V can be coupled with silicon tetrachloride to form four arm radial polymer IX:

(R—FIRST POLYMER—FM—SECOND POLYMER)$_4$—Si    IX wherein FM and R are as described above. In the alternative, living polymer V can be reacted with compound I or compound II to form a new living polymer of structure X:

R—FIRST POLYMER—FM—SECOND POLYMER—FM—Li  X wherein FM and R are as described above. Living polymer X can be quenched with a proton donor to form polymer XI:

R—FIRST POLYMER—FM—SECOND POLYMER—FM—H  XI wherein FM and R are as described above.

In a separate embodiment, after formation of living polymer X is complete, a third polymerizable monomer can be added to living polymer X and a third polymerization reaction run to form living polymer XII:

R—P$_1$—FM—P$_2$—FM—P$_3$—Li    XII wherein FM and R are as described above, and wherein P$_1$ is the first polymer block formed, P$_2$ is the second polymer block formed, and P$_3$ is the third polymer block formed.

The reaction conditions to form the third polymeric segment are identical to those recited above for preparation of the first polymeric segment. The molecular weight of the third polymeric segment formed can vary widely between about 500 to about 200,000, most preferably between about 1000 and about 100,000. Moreover, the molecular weight of the third polymeric segment may be roughly the same as the molecular weight of the first polymeric segment and/or the second polymeric segment. On the other hand, the molecular weight of the third polymeric segment may differ from that of either the first polymeric segment or the second polymeric segment.

Living polymer XII can be quenched as described above to form polymer XIII or reacted with compound I or compound II and then quenched to form polymer XIV. In the alternative, living polymer XII can be coupled as described above to form a linear polymer XV, a three arm radial polymer XVI, or a four arm radial polymer XVII:

R—P$_1$—FM—P$_2$—FM—P$_3$—H    XIII

R—P$_1$—FM—P$_2$—FM—P$_3$—FM·H    XIV (R—P$_1$—FM—P$_2$—FM—P$_3$)$_2$—Si(CH$_3$)$_2$    XV (R—P$_1$—FM—P$_2$—FM—P$_3$)$_3$—SiH    XVI (R—P$_1$—FM—P$_2$—FM—P$_3$)$_4$—Si    XVII wherein FM and R are as described above, and wherein P$_1$ is the first polymer segment formed,
P$_2$ is the second polymer segment formed, and P$_3$ is the third polymer segment formed.

What is claimed is:

1. A process for forming a polymer with functional groups selectively placed within said polymer, comprising the steps of:

supplying a first anionically polymerizable monomer;

adding to said first monomer an anionic polymerization initiator, said anionic polymerization initiator containing a cationic counterion, to form a first anionically terminated polymer chain;

adding to said first anionically terminated polymer chain a functional monomer selected from the group consisting of compound I, compound II, and mixtures thereof

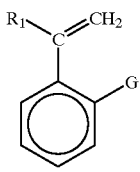   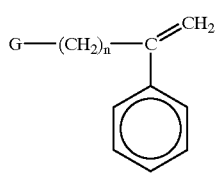

I    II to form a second anionically terminated polymer chain, wherein n is 1 to 5, R$_1$ is hydrogen or an alkyl group, and G is a functional group selected to coordinate with said cationic counterion such that only a single unit of said functional monomer adds to said first anionically terminated polymer chain.

2. The process of claim 1, wherein G is selected from the group consisting of —O—CH$_3$, —O—CH$_2$—O—CH$_3$, —O—CH$_2$-Phenyl, —S—CH$_3$, —CH$_2$—O—CH$_3$, —CH$_2$—N(CH$_3$)$_2$, and —O—CH$_2$—CH=CH$_2$.

3. The process of claim 1, wherein said first anionically polymerizable monomer is selected from the group consisting of 1,3-butadiene, 2,3-dimethyl-1,3-butadiene, piperylene, 3-butyl-1,3-octadiene, isoprene, and 2-phenyl-1,3-butadiene, styrene, the methylstyrenes, the propylstyrenes, vinylnaphthalene, cyclohexylstyrenes, p-tolylstyrene, 1-vinyl-5-hexylnaphthalene, and mixtures thereof.

4. The process of claim 1, wherein said anionic polymerization initiator is selected from the group consisting of methyllithium, isopropyllithium, naphthyllithium, t-octyllithium, n-dodecyllithium, n-eicosyllithium, phenyllithium, p-tolyllithium, 4-phenylbutyllithium, n-hexyllithium, n-octyllithium, cyclohexyllithium, sec-butyllithium, n-butyllithium, alpha-methylstyryllithium, 1,1-diphenylhexyllithium, diphenylmethyllithium or —sodium or —potassium and 1,1-diphenyl-3-methylpentyllithium, dimethyl lithium amide, diethyl lithium amide, 1,1,4,4-tetraphenyl-1,4-dilithiobutane, and mixtures thereof.

5. The process of claim 4, wherein said anionic polymerization initiator further comprises an additional component, wherein that additional component is selected from the group consisting of said compound I, said compound II, and mixtures thereof.

6. The process of claim 1, further comprising the step of reacting said second anionically terminated polymer with a proton donor.

7. The process of claim 1, further comprising the step of adding to said second anionically terminated polymer chain a second anionically polymerizable monomer to form a third anionically terminated polymer chain.

8. The process of claim 7, wherein said second anionically polymerizable monomer is selected from the group consisting of 1,3-butadiene, 2,3-dimethyl-1,3-butadiene, piperylene, 3-butyl-1,3-octadiene, isoprene, and 2-phenyl-1,3-butadiene, styrene, the methylstyrenes, the propylstyrenes, vinylnaphthalene, cyclohexylstyrenes, p-tolylstyrene, 1-vinyl-5-hexylnaphthalene, and mixtures thereof.

9. The process of claim 7, further comprising the step of reacting said third anionically terminated polymer chain with a proton donor.

10. The process of claim 7, further comprising the step of coupling said third anionically terminated polymer chain with a difunctional coupling agent.

11. The process of claim 7, further comprising the step of coupling said third anionically terminated polymer chain with a trifunctional coupling agent.

12. The process of claim 7, further comprising the step of coupling said third anionically terminated polymer chain with a tetrafunctional coupling agent.

13. The process of claim 7, further comprising the step of adding to said third anionically terminated polymer chain a functional monomer selected from the group consisting of said compound I, said compound II, and mixtures thereof, such that a single unit of said functional monomer adds to said third anionically terminated polymer chain to form a fourth anionically terminated polymer chain.

14. The process of claim 13, further comprising the step of reacting said fourth anionically terminated polymer chain with a proton donor.

15. The process of claim 13, further comprising the step of adding to said fourth anionically terminated polymer chain a third anionically polymerizable monomer to form a fifth anionically terminated polymer chain.

16. The process of claim 15, wherein said third anionically polymerizable monomer is selected from the group consisting of 1,3-butadiene, 2,3-dimethyl-1,3-butadiene, piperylene, 3-butyl, 1,3-octadiene, isoprene, and 2-phenyl-1,3-butadiene, styrene, the methylstyrenes, the propylstyrenes, vinylnaphthalene, cyclohexylstyrenes, p-tolylstyrene, 1-vinyl-5-hexylnaphthalene, and mixtures thereof.

17. The process of claim 15, further comprising the step of reacting said fifth anionically terminated polymer chain with a proton donor.

18. The process of claim 15, further comprising the step of coupling said fifth anionically terminated polymer chain with a difunctional coupling agent.

19. The process of claim 15, further comprising the step of coupling said fifth anionically terminated polymer chain with a trifunctional coupling agent.

20. The process of claim 15, further comprising the step of coupling said fifth anionically terminated polymer chain with a tetrafunctional coupling agent.

21. A polymer chain structure formed from anionically polymerizable monomers, further containing one or a plurality of functional repeat units selected from the group consisting of compound I, compound II, and mixtures thereof

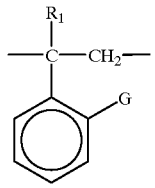

I

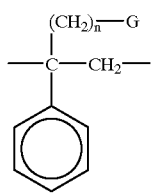

II selectively placed as individual repeat units within said polymer structure, wherein n is 1 to 5, $R_1$ is hydrogen or an alkyl group, and G is an electron donor functional moiety.

22. The polymer chain structure of claim 21, wherein G is selected from the group consisting of —O—$CH_3$, —O—$CH_2$—O—$CH_3$, —O—$CH_2$-Phenyl, —S—$CH_3$, —$CH_2$—O—$CH_3$, —$CH_2$—N($CH_3$)$_2$, and —O—$CH_2$—CH=$CH_2$.

23. The polymer chain structure of claim 21, wherein said anionically polymerizable monomers are selected from the group consisting of 1,3-butadiene, 2,3-dimethyl-1,3-butadiene, piperylene, 3-butyl-1,3-octadiene, isoprene, and 2-phenyl-1,3-butadiene, styrene, the methylstyrenes, the propylstyrenes, vinylnaphthalene, cyclohexylstyrenes, p-tolystyrene, and 1-vinyl-5-hexylnaphthalene.

24. The polymer produced by the process of claim 10.
25. The polymer produced by the process of claim 11.
26. The polymer produced by the process of claim 12.
27. The polymer produced by the process of claim 18.
28. The polymer produced by the process of claim 19.
29. The polymer produced by the process of claim 20.
30. An initiator to polymerize anionically polymerizable monomers, comprising the addition product of an alkyllithium compound and a compound selected from the group consisting of compound I, compound II, and mixture thereof

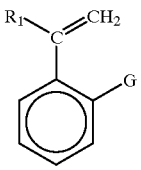 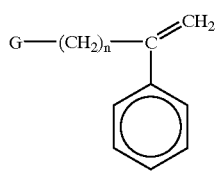

I  II wherein n is 1 to 5, $R_1$ is hydrogen or an alkyl group, and G is selected from the group consisting of —O—$CH_3$, —O—$CH_2$—O—$CH_3$, —O—$CH_2$-Phenyl, —S—$CH_3$, —$CH_2$—O—$CH_3$, —$CH_2$—N($CH_3$)$_2$, and —O—$CH_2$—CH=$CH_2$.

31. The initiator of claim 30, wherein said alkyllithium compound is selected from the group consisting of methyllithium, isopropyllithium, naphthyllithium, t-octyllithium, n-dodecyllithium, n-eicosyllithium, phenyllithium, p-tolyllithium, 4-phenylbutyllithium, n-hexyllithium, n-octyllithium, cyclohexyllithium, sec-butyllithium, n-butyllithium, alpha-methylstyryllithium, 1,1-diphenylhexyllithium, diphenylmethyllithium or sodium or -potassium and 1,1-diphenyl-3-methylpentyllithium, dimethyl lithium amide, diethyl lithium amide, 1,1,4,4-tetraphenyl-1,4-dilithiobutane, and mixtures thereof.

32. The initiator of claim 31, wherein said anionically polymerizable monomers are selected from the group consisting of 1,3-butadiene, 2,3-dimethyl-1,3-butadiene, piperylene, 3-butyl-1,3-octadiene, isoprene, and 2-phenyl-1,3-butadiene, styrene, the methylstyrenes, the propylstyrenes, vinylnaphthalene, cyclohexylstyrenes, p-tolystyrene, and 1-vinyl-5-hexylnaphthalene.

* * * * *